June 20, 1933.  I. FLORMAN  1,915,222
BATHROOM SCALE
Filed April 11, 1933  3 Sheets-Sheet 1
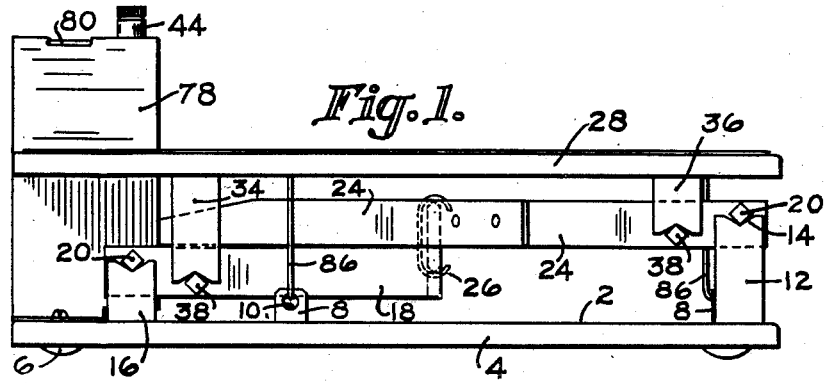
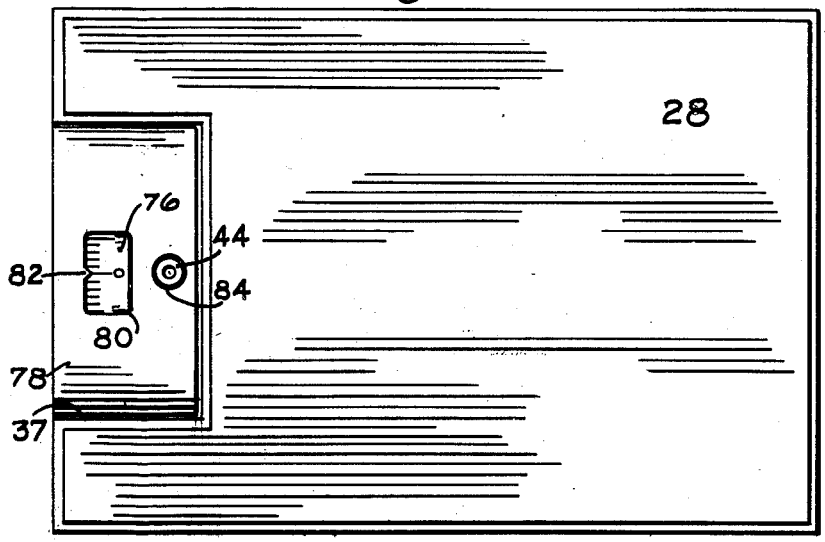
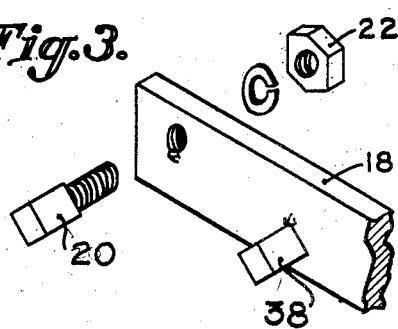
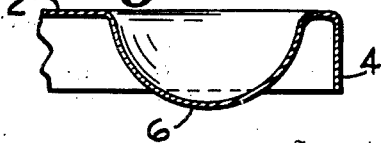
Inventor
IRVING FLORMAN

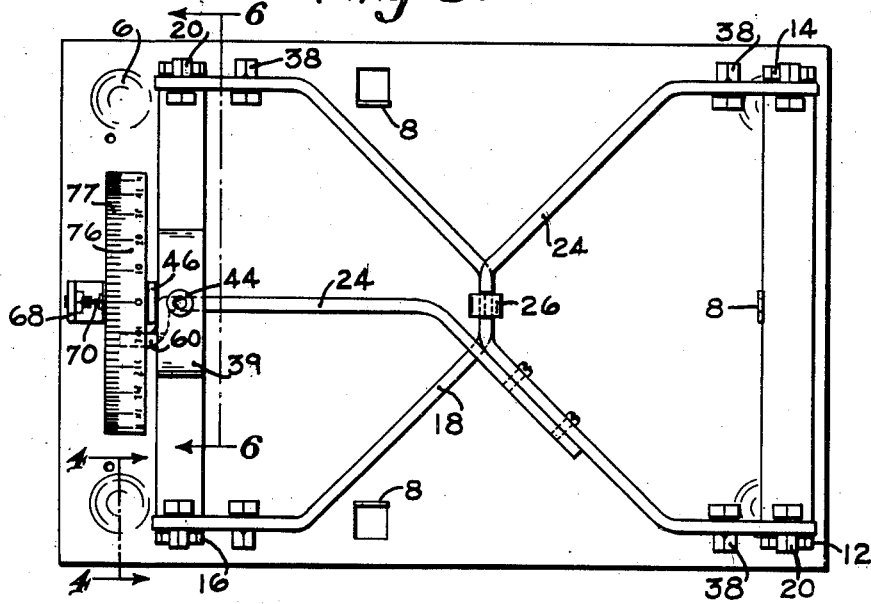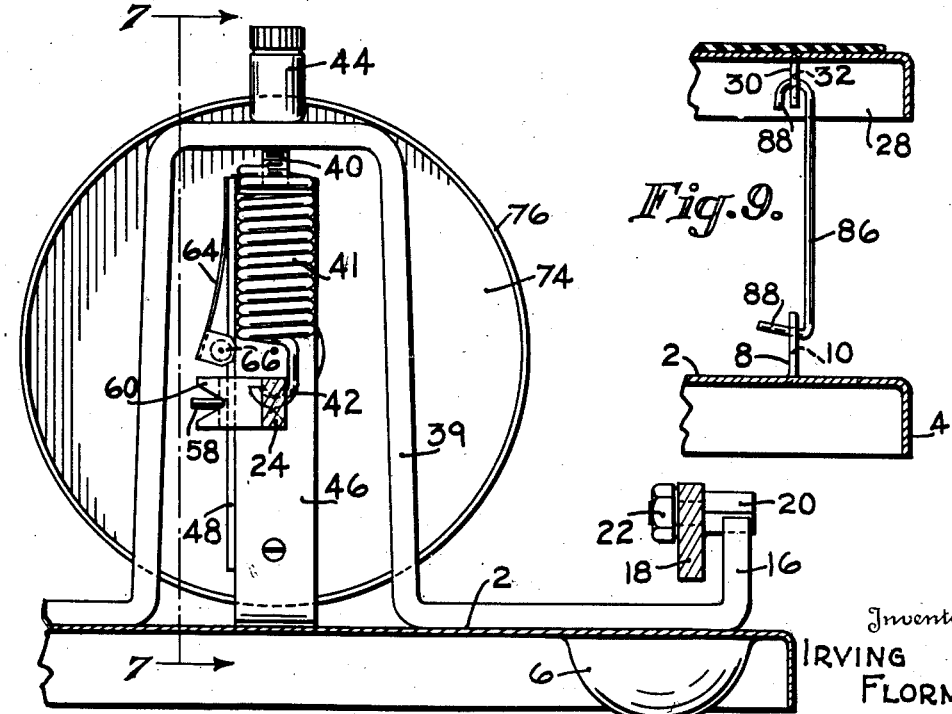

June 20, 1933.  I. FLORMAN  1,915,222
BATHROOM SCALE
Filed April 11, 1933  3 Sheets-Sheet 3

Inventor
IRVING FLORMAN
By
Attorney

Patented June 20, 1933

1,915,222

UNITED STATES PATENT OFFICE

IRVING FLORMAN, OF NEW YORK, N. Y.

BATHROOM SCALE

Application filed April 11, 1933. Serial No. 665,603.

My invention relates to scales and particularly to platform scales of the bathroom type.

Bathroom scales as heretofore made have had a number of disadvantages. One of the principal drawbacks has been that they have been rather complicated and therefore expensive. As a rule, scales of this type are relatively high and are likely to be in the way when the bathroom is in use.

In the manufacture of small scales of this nature, one of the principal disadvantages has been the difficulty of getting the scale properly adjusted. In the past, this has been done by setting up the scale lever mechanism, putting a dummy platform on the levers, and then adjusting the position of the pivots and the levers so that the scale is properly balanced when this dummy platform is used. When, however, the dummy platform is removed and the normal platform substituted, further adjustment is often necessary and this is generally done more or less by guesswork.

When scales which depend on a knife edge are used for this purpose, the hard usage to which they are subjected and the constantly damp atmosphere to which they are often exposed are likely to cause wear on the edges sufficient to destroy the accuracy of the scale completely. When this occurs, the scale is normally discarded or else must be returned for the installation of new edges.

Another disadvantage in such scales is that the rack which engages with the pinion for turning the dial is likely to slip out of engagement and the scale will thus be thrown completely out of adjustment and will be inaccurate.

Finally, bathroom scales have been as a rule heavy and awkward to handle.

The object of this invention is to provide a satisfactory and inexpensive bathroom scale which will yet be accurate, small and light in weight.

According to my invention, no side walls are used around the scale mechanism, this scale consisting merely of a base and a platform with lever mechanism between the two. The base and platform are held together by a few short pieces of wire, bars or the like so that the lever mechanism is wholly open at the sides. This type of scale can be adjusted with the platform in place and the pivot points of the levers can be suitably located and arranged immediately and without the use of a dummy platform. Since the scale is open at the side, there is no need to remove the platform and replace it constantly during this adjustment. This makes the scale easier to manufacture and more accurate when it is finished.

According to another feature of the invention, the knife edges which form the pivots between the various levers are the corners of members which are square in cross section. When any knife edge is worn, these members can be turned through 90° so as to present a new corner and each element therefore has four times the wear of a normal edge. It is quite simple by merely releasing a nut to turn this member to present a new edge so that the scale can be quickly adjusted for further use by the purchaser.

According to another feature of the invention, the scale is made very low and the dial turns on a horizontal axis which is located within the limits of the base and below the plane of the platform. The scale platform has a cut out portion which accommodates the dial, the spring, and the motion converting mechanism. This converting mechanism is located between two of the pivots of the scale levers, thus making the device extremely compact and small. The dial, spring and rack mechanism extend below the platform so as to reduce the height of the scale. The dial consists of a disc mounted on a horizontal axis, this disc having a flange carrying the indicia. This flange encloses the motion converting mechanism.

Furthermore, the rack which is moved by the scale levers to turn the dial is guided in a housing rigidly mounted on the base and is spring pressed into engagement with the pinion so that no slipping can occur. The rack itself is aligned with the body portion of the lever which transmits movement to it so that errors which are often caused by the arcuate movement of the lever end are avoided or compensated.

Another feature of the invention resides in the fact that the levers of which the scale is made are formed of pressed or stamped steel. In the past, scale levers have been made of cast iron. I have discovered that a scale having the levers formed of cast iron will not retain its accuracy while one having pressed steel levers remains completely accurate over a long period. In addition, such a scale is stronger and less likely to be broken and yet is of light weight.

Further objects and advantages of the invention may be more fully understood from the following description when taken in conjunction with the following drawings which form a part thereof.

In the drawings:

Fig. 1 shows my scale in side elevation.

Fig. 2 is a top plan view of the same.

Fig. 3 is a detail view of two of the pivots, one being disassembled.

Fig. 4 is a detail cross section on the line 4—4 of Fig. 5.

Fig. 5 is a top plan view of the scale with the platform and indicating mechanism case removed.

Fig. 6 is an enlarged cross section on the line 6—6 of Fig. 5.

Fig. 9 is a detail view of the connecting means between the base and platform.

Figure 7:
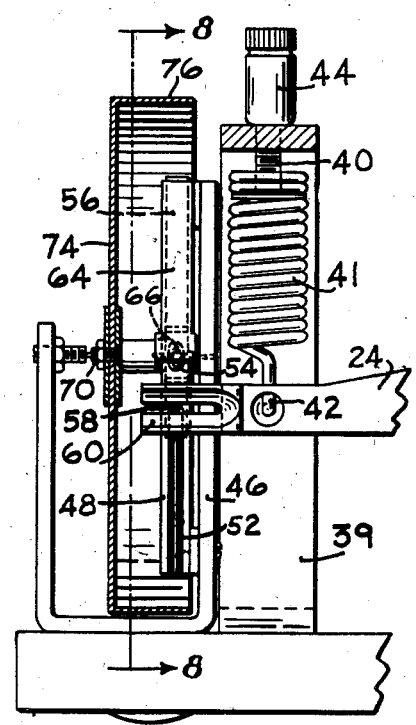
Fig. 7 is a cross section on the line 7—7 of Fig. 6.
Figure 8:
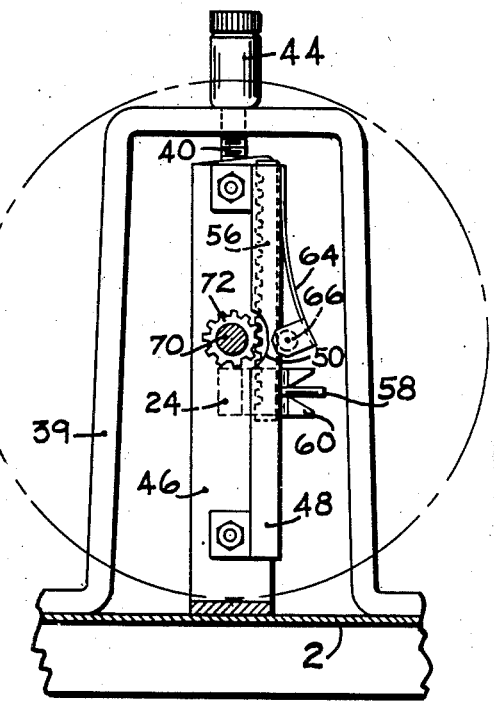
Fig. 8 is a cross section on the line 8—8 of Fig. 7.
Figure 10:
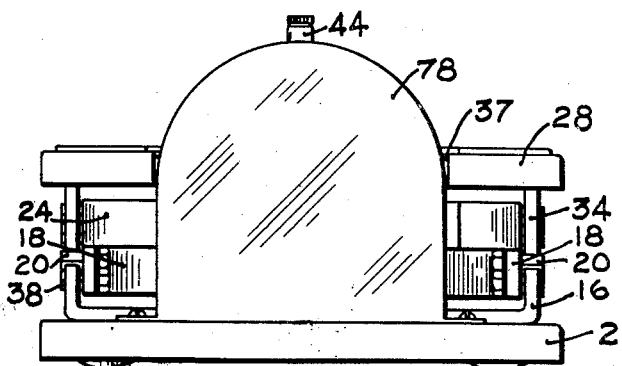
Fig. 10 shows the scale in front elevation.

The scale includes a base 2 having around its edge a downwardly turned flange 4 and having stamped from its surface four or more semi-spherical downward projections 6 which extend a slight distance below the edges of the flange and serve as balls to support the scale. Three or more ears 8 are struck up from the base and are provided with apertures 10. At the rear end of the scale are uprights 12 having in their tops V-shaped notches 14. Similar uprights 16 of less height are provided at the front of the scale on each side thereof. A U-shaped pressed steel lever 18 is provided at the ends of its legs with bolts 20 having square heads and held in place by nuts 22. The edges of the square heads of these bolts rest in the V notches in the tops of the uprights 16 to form a pivot for this lever. A Y-shaped pressed steel lever 24 is likewise provided at the ends of its arms with bolts 20 the corners of the heads of which engage the V-shaped notches 14 in the uprights 12. These two levers each extend towards the central portion of the scale and are connected together about the center of the scale by a metal clip 26 or the like. This general type of leverage system is well known.

The scale platform 28 is provided on its underside with downwardly struck ears 30 having apertures 32. This platform is substantially coextensive with the base 2 and has near its front edge long downward extensions 34 and near its rear end shorter downward extensions 36. These extensions have at their lower ends V-shaped notches which rest on square headed bolts 38 mounted on the levers 18 and 24 near the pivots thereof. At its front end the platform has a cut out portion 37 for receiving the indicating mechanism to be described below.

Between the pivots of the lever 18 an inverted U frame 39 is mounted on the base 2. A threaded stem 40 extends through the top of this frame and supports at its lower end a spring 41, the other end of which is secured at 42 to the lever 24. A nut 44 is threaded on the stem 40 above the horizontal portion of the frame so that by rotation of this nut the tension of the spring can be regulated.

Just in front of the frame 39 and substantially centrally thereof is an upright member 46 on which is mounted a vertical tube 48 of square cross section. This tube is provided at one side with a cut away portion 50 and at the other side in its lower part with a slot 52 and opposite the cut away portion 50 with an opening 54. A rack 56 slides in this tube and is provided with a pin 58 which slides in the slot 52. The end of the lever 24 is extended and is bent around the upright 46 and provided with a forked end 60 which engages the pin 58. The edges of this fork which engage this pin are formed as knife edges so as to decrease the friction and increase the accuracy of the scale. A leaf spring 64 is mounted on the rear side of the guide 48 and carries a roller 66 which extends through the opening 54 and engages the rack 56 so as to press it in the direction of the opening 50.

Between the upright 46 and a second upright 68 is arranged a horizontal shaft 70 on which is rigidly secured a pinion 72 which engages the rack 56 through the opening 50. Furthermore, the shaft 70 is provided with a disc 74, the outer edge of which is flanged over the pinion 72 as at 76. This flanged edge is provided with indicia 77 to form the scale dial.

A case 78 having an opening 80 provided with an arrow 82 above the dial is secured in any suitable manner on the base 2. In addition, this case has a second opening 84 through which extends the nut 44 so as to permit adjustment of the scale by the use, if necessary.

The platform is held on the base by means of wires 86 having bent ends 88 which engage in the apertures 10 and 32 of the ears on the base and platform respectively. This leaves the lever system fully accessible since no side walls are used.

It will be noted from the drawings that the front or engaging edge of the rack is substantially in alignment with the body of the lever 24. It will also be evident that the pinion and rack are arranged within the dial which provides considerable economy in the matter of space.

While I have described herein one embodiment of my invention, I wish it to be understood that I do not intend to limit myself thereby except within the scope of the appended claims.

I claim:

1. In a bathroom scale, a base, lever mechanism mounted on said base including a plurality of levers each having two pivots, the pairs of pivots being located at opposite ends of the base, a platform mounted on said lever mechanism and substantially coextensive with said base but having a cut out portion at one end thereof, an upright member at said end mounted on said base and having a horizontal portion, a spring supported on said horizontal portion and connected to said lever mechanism, a second upright portion adjacent said first upright portion, a rack vertically slidably mounted on said second upright portion and connected to said lever mechanism for movement thereby, a shaft mounted on said second upright portion, a pinion mounted on said shaft and in engagement with said rack and an indicating dial including a disc having a flange around its edge mounted on said shaft, said flange being turned in the direction of said pinion and covering and enclosing said pinion and rack and the connection between said rack and said lever mechanism.

2. In a bathroom scale, a base, lever mechanism mounted on said base including a plurality of levers each having two pivots, the pairs of pivots being located at opposite ends of the base, a platform mounted on said lever mechanism and substantially coextensive with said base but having a cut out portion at one end thereof, an upright member at said end mounted on said base between the lever pivots and having a horizontal portion, a spring supported on said horizontal portion and connected to said lever mechanism, a second upright portion adjacent said first upright portion, a rack vertically slidably mounted on said second upright portion and connected to said lever mechanism for movement thereby, a shaft mounted on said second upright portion, a pinion mounted on said shaft and in engagement with said rack and an indicating dial including a disc having a flange around its edge mounted on said shaft, said flange being turned in the direction of said pinion and covering and enclosing said pinion and rack and the connection between said rack and said lever mechanism, said lever mechanism being substantially completely open at the sides and relatively narrow connecting members connecting said platform to said base.

3. In a bathroom scale as claimed in claim 1, relatively narrow connecting members connecting said platform to said base.

4. A bathroom scale comprising a base, levers pivoted adjacent the opposite ends of said base, a platform mounted on said levers, a dial mounted to turn on a horizontal axis running longitudinally of the platform and readable from above connected to said levers, said dial being disposed in part below and in part above said platform, a spring for resisting movement of said levers, said spring being arranged substantially in transverse alignment with the pivots adjacent one end of said base, said platform being substantially coextensive with said base and having a cut away portion at one end, said dial being disposed within said cut away portion.

5. A bathroom scale comprising a substantially rectangular base, levers pivoted adjacent the opposite ends of said base, a platform mounted on said levers substantially coextensive with said base, said platform having a portion cut away at one end, means resisting movement of said levers disposed substantially in vertical alignment with said cut way portion and in transverse alignment with the pivots adjacent one end of the base, and a dial mounted to rotate on a horizontal axis running longitudinally of the platform disposed within said cut away portion and lying in part below and in part above the plane of the platform and connected to said levers.

6. In a bathroom scale, a horizontal shaft, a dial comprising a disc mounted on said horizontal shaft and provided with a flange around its periphery having indicia thereon, a pinion on said shaft on the same side of said disc as said flange and within the cylindrical space defined by said flange, and a rack in engagement with said pinion.

7. In a bathroom scale, a horizontal shaft, a dial comprising a disc mounted on said horizontal shaft and provided with a flange around its periphery having indicia thereon, a pinion on said shaft on the same side of said disc as said flange and within the cylindrical space defined by said flange, a vertical tube mounted adjacent said pinion and within said cylindrical space, and a rack guided in said tube and engaging said pinion.

8. In a scale as claimed in claim 7, spring means on said tube engaging said rack to press said rack against said pinion.

9. In a bathroom scale, a horizontal shaft, a dial comprising a disc mounted on said horizontal shaft and provided with a flange around its periphery having indicia thereon, lever mechanism extending into the cylindrical space defined by said flange, and means to convert movement of said lever mechanism to rotation of said shaft, said means being located within said cylindrical space.

10. In a bathroom scale, a base, lever mechanism mounted on said base, a vertical tube, a rack guided for sliding movement in said tube and connected to said lever mechanism, an indicating member having a pinion thereon in engagement with said rack, said tube having an opening therein behind said rack, a leaf spring mounted on the outside of said tube behind said rack, and a roller on the free end of said leaf spring extending through said opening and engaging said rack to press the rack against the pinion.

In testimony whereof, I have hereunto set my signature.

IRVING FLORMAN.